(12) United States Patent
Santana Arnaiz, Sr. et al.

(10) Patent No.: US 12,414,027 B2
(45) Date of Patent: Sep. 9, 2025

(54) RELIABLE AND SECURITY-AWARE COMMUNICATION IN A HYBRID WIRELESS NETWORK

(71) Applicant: SIGNIFY HOLDING B.V., Eindhoven (NL)

(72) Inventors: Octavio Alejandro Santana Arnaiz, Sr., Eindhoven (NL); Xiangyu Wang, Eindhoven (NL); Armand Michel Marie Lelkens, Heerlen (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 222 days.

(21) Appl. No.: 17/926,288

(22) PCT Filed: May 31, 2021

(86) PCT No.: PCT/EP2021/064534
§ 371 (c)(1),
(2) Date: Nov. 18, 2022

(87) PCT Pub. No.: WO2021/245019
PCT Pub. Date: Dec. 9, 2021

(65) Prior Publication Data
US 2023/0217344 A1    Jul. 6, 2023

(30) Foreign Application Priority Data
Jun. 2, 2020   (EP) .................................... 20177738

(51) Int. Cl.
*H04W 40/04*   (2009.01)
*H04W 84/18*   (2009.01)

(52) U.S. Cl.
CPC ........... *H04W 40/04* (2013.01); *H04W 84/18* (2013.01)

(58) Field of Classification Search
None
See application file for complete search history.

(56) References Cited

U.S. PATENT DOCUMENTS 9,860,684 B2    1/2018   Jin et al.
9,894,512 B2    2/2018   Raghu et al.
(Continued)

FOREIGN PATENT DOCUMENTS

| CN | 101471704 B | 3/2013 |
|----|-------------|--------|
| CN | 111052687 A | 4/2020 |

(Continued)

*Primary Examiner* — Walter J Divito (57) ABSTRACT

The present invention relates to a wireless system 100 running multiple applications at the same time, such as for both lighting control and asset tracking. A node 200 comprised in the wireless system 100 is capable to operate in multiple communication modes, with each communication mode is according to a different communication technology. One the other hand, one application may have a preferred communication mode different from another application, considering some applications may have higher security requirements than the others. In view of this, a mode switching method is disclosed to assist the node 200 to serve multiple parallel applications in an efficient manner.

10 Claims, 3 Drawing Sheets

(56) References Cited

U.S. PATENT DOCUMENTS

| | | | |
|---|---|---|---|
| 2014/0192723 A1* | 7/2014 | Schenk | H05B 47/19 |
| | | | 370/328 |
| 2015/0133160 A1* | 5/2015 | Sheynblat | H04W 48/16 |
| | | | 455/456.2 |
| 2017/0353365 A1 | 12/2017 | Li et al. | |
| 2017/0359804 A1 | 12/2017 | Manku et al. | |
| 2021/0195684 A1* | 6/2021 | Sturek | H04W 84/18 |

FOREIGN PATENT DOCUMENTS

| | | |
|---|---|---|
| EP | 3255949 A1 | 12/2017 |
| WO | 2018228883 A1 | 12/2018 |
| WO | 2020043592 A1 | 3/2020 |
| WO | 2020164758 A1 | 8/2020 |
| WO | 2020182562 A1 | 9/2020 |

* cited by examiner

RELIABLE AND SECURITY-AWARE COMMUNICATION IN A HYBRID WIRELESS NETWORK

CROSS-REFERENCE TO PRIOR APPLICATIONS

This application is the U.S. National Phase application under 35 U.S.C. § 371 of International Application No. PCT/EP2021/064534, filed on May 31, 2021, which claims the benefit of European Patent Application No. 20177738.0, filed on Jun. 2, 2020. These applications are hereby incorporated by reference herein.

FIELD OF THE INVENTION

The invention relates to the field of wireless communication systems. More particularly, various methods, apparatus, systems and computer-readable media are disclosed herein related to a communication method of a node in a wireless system comprising a plurality of nodes.

BACKGROUND OF THE INVENTION

There is an ongoing trend in the professional lighting market to move more and more towards connected lighting systems, which enable all kinds of new features like (remote) scheduling, energy monitoring, sensor-based lighting control and asset management. In many cases these systems are installed in existing buildings, in which cases a wireless network is preferred to avoid having to deploy new cables (for lighting control) through the ceiling. Examples of such wireless network protocols which are used widely in current practice are open standards like Zigbee, Thread, Bluetooth Low Energy (BLE), BLE mesh, Wi-Fi, Wi-Fi direct, and various proprietary network implementations built on top of the IEEE 802.15.4, IEEE 802.15.1 or IEEE 802.11 standards.

Zigbee networks allow multi-hop communication among devices in a mesh topology. In addition to mesh networking capability, Zigbee devices also offer reduced power consumption and cost, which make them attractive for use in large-scale deployments of wireless control systems, such as for wireless lighting systems.

In an indoor environment, location-based systems, such as a Real-Time Location System (RTLS), may also be deployed to locate and track assets such as equipment, people, etc. For example, an asset tag attached to an asset (e.g., a laptop) may transmit a beacon signal, and sensors located at fixed locations may receive the beacon signal. The beacon signals may be sent via a BLE radio, for the ease of link configuration.

WO2018228883A1 is related to a system and method to extend the coverage of a wireless single-hop network (e.g. BLE network) by relaying messages of the wireless single-hop network on a wireless multi-hop network (e.g. ZigBee mesh network), benefitting from a combined single-hop/multi-hop (e.g. BLE/ZigBee) capability of wireless combo devices which can seamlessly bridge between the two wireless networks.

EP3255949A1 is related to a method for communicating between a combo-endpoint device, wireless router and a wireless communication device, which includes monitoring communication patterns of wireless data communications between a wireless router and radio-communication circuitry of a combo-endpoint device, and storing data indicative of communication times of the wireless router based on the monitored communication patterns.

WO2020043592A1 is related to a system for selecting one or more devices in a wireless network for transmitting, receiving and/or processing a radio frequency signal for presence and/or location detection comprises at least one processor configured to determine a suitability of each of a plurality of devices for transmitting, receiving and/or processing a radio frequency signal for presence and/or location detection, select a subset of devices from the plurality of devices based on the suitability determined for each of the plurality of devices, and instruct at least one of the subset of devices to act as a device for transmitting, receiving and/or processing a radio frequency signal for presence and/or location detection

SUMMARY OF THE INVENTION

It is recognized by the inventors that it is beneficial to reuse the same infrastructure of a lighting control system for asset tracking, such that a node may be configured to operate in one communication mode mainly for the lighting control, or in another communication mode mainly for asset tracking. A lighting system provides unique advantages for implementing asset tracking, or RTLS, because the density of the electrical devices (light fixtures) supports a dense network of sensors for locating and tracking objects. Although the preferred communication mode for lighting control is different from the preferred communication mode for asset tracking, it is possible to deploy a node capable to support multiple communication modes to fulfil the requirements from different applications.

In view of the above, the present disclosure is directed to methods, apparatus, systems, computer program and computer-readable media for providing a mechanism related to controlling the communication method of a node to facilitate hybrid applications of the system in an efficient manner.

In accordance with a first aspect of the invention a node is provided. A node for communication in a wireless system, the node comprising a controller configured to determine a default communication mode out of multiple communication modes according to a role assigned to the node, wherein the role is related to an activity to be carried out by the node, and the multiple communication modes comprise a first communication mode capable to support a mesh or tree topology with multi-hop routing, according to a first communication technology, and a second communication mode capable to support a star topology with a point-to-point connection, according to a second communication technology; a radio unit configured to either operate in the first communication mode as the default communication mode, and upon an instruction from the controller, switch to the second communication mode and send a notification message in the second communication mode, and then switch back to the first communication mode; or operate in the second communication mode as the default communication mode, and upon another instruction from the controller, switch to the first communication mode and receive another data or control packet in the first communication mode, and then switch back to the second communication mode; and wherein the controller is further configured to generate the instruction to switch from the first communication mode to the second communication mode according to a security level of a data or control packet received by the radio unit in the first communication mode or recently generated by the node itself; and generate the other instruction to switch from the second communication mode to the first communication mode according to another notification message received by the radio unit in the second communication mode.

The node is capable to support multiple, two or more, communication modes comprising the first communication mode and the second communication mode. The main communication mode will be the default operation mode of the node. Preferably, the first communication mode is according to a Zigbee standard, which is widely adopted in home automation and lighting control applications. The Zigbee network layer natively supports both star and tree networks, and generic mesh networking. The powerful topology control provides it great flexibility in a control system, especially for reaching destination nodes that are far away from a source node with a direct link, or a one-hop link. In a preferred setup, the second wireless communication technology is in accordance with a BLE standard. Advantageously, the point-to-point connection according to the second communication technology may also be a point-to-multipoint connection. The easy setup of point-to-point or point-to-multipoint connections, such as via BLE beacons, is very beneficial to the link establishment between a tag device and a sensor node in an asset tracking system. Optionally, the node may also support a further communication mode for another use of the node, or another application to be supported by the system.

The radio unit may comprise one or more transceivers to enable the multiple communication modes, such that one transceiver may support only one individual communication mode, or one transceiver may support more than one communication modes. In a preferred setup, the radio unit is a combo transceiver supporting both the first communication mode and the second communication mode.

In one example, the radio unit may be a Zigbee and BLE combo device. And hence, the node having such a combo transceiver may switch between the first and the second communication modes on a time-sharing basis, which may be a very cost-efficient manner to enable different applications in the same wireless system. Since the main communication mode is the default operation mode of the node, the radio unit will stay in the main communication mode most of its time, or for a majority of its duty cycle.

The switching from the main communication mode to the other communication mode is not following a fixed time schedule but is based on a trigger event, which improves the reliability and flexibility of the system. Preferably, the trigger event is an instruction generated by the controller based on a property of a packet that is either recently received by the radio unit in the main communication mode or recently generated by the node itself. In response to such an instruction, the radio unit switches temporarily to the other communication mode out of the multiple communication modes for sending or receiving using the other communication mode, and then switch back to the main communication mode. Therefore, the node operates in the main communication mode by default to serve a main application, and then may temporarily switch to the other communication mode to support another application enabled in the system.

The packet may be a packet recently received in the main communication mode from another node in the wireless system, or from another device in the surroundings. It may also be a packet recently generated by the node itself. For example, the node may be a source of an application packet, and it generates a new packet to be distributed through the network or to a certain destination node instead of receiving from another node. The other device in the surroundings may be a new tag or sensor device placed in the surroundings.

In one embodiment, the property of the packet is at least one of a type of the packet, a security level of the packet, and information contained in the packet.

The instruction is generated by the controller according to a property of the recently received or generated packet. Depending on the role assigned or the main communication mode, different aspects may be considered regarding the recently received or generated packet. In some scenarios, those aspects may also be considered in a joint manner, such that one or more aspects are considered in combination.

Advantageously, the type of the packet may be a data packet, a control packet, a beacon, or a notification message.

Depending on the application to be enabled, different types of packets may be communicated in the wireless system. Some packets may be circulated among the nodes serving a same type of application, while some other packets may be delivered to the other nodes mainly serving another type of application.

For example, lighting control information may be assembled in a control packet distributed to most of the nodes in the lighting control system, including some nodes that serve asset tracking application in a default mode. On the other hand, beacons from a tag device may be interesting only to the nodes mainly assigned to the asset tracking application, while less relevant to the other nodes mainly assigned to lighting control.

To forward the lighting control packet to the nodes mainly assigned to the asset tracking application, the security level of the control packet may be considered. For example, the point-to-point connection according to the second communication technology may be considered less secure as compared to the first communication technology. It may happen that a control packet with a relaxed security requirement may be sent directly via the second communication mode, while the control packet with a strict security requirement can only be circulated via the first communication mode. Then, in order to allow some nodes mainly operating in the second communication mode to receive such a control packet, a notification message may be sent first via the second communication mode to those nodes to trigger them to switch to the first communication mode for receiving the actual control packet.

In another example, a notification message may further comprise address information for the other communication mode, which can be a unicast address, or a multicast address, or a combination of both. Although the notification message itself may be sent as an advertisement to all the neighboring nodes, only the nodes that are addressed by the address information may be triggered to switch to the other communication mode.

In another embodiment, the notification message indicates scheduling information related to switching to the first communication mode, which can be at least one of:

a delay, after which, subsequent to the reception of the notification message, the radio unit shall switch to the first communication mode, and a time duration that the node shall stay in the first communication mode.

In order to coordinate the main and the other communication mode in a more timely manner, it is advantageous that the recently received or generated packet also indicates more precisely when the node needs to switch to the other communication mode. It may be quite efficient to make such a schedule or planning for the node, such that it can get aligned beforehand with another intended receiver or transmitter for the transmitting or receiving activity in the other communication mode.

It may also be beneficial that the recently received or generated packet specifies a time duration, or dwelling time, for the node with regard to the temporarily switching to the other communication mode. For example, by specifying a certain time duration may help the node to avoid unnecessarily long waiting time in the other communication mode, considering potential packet loss due to bad channel condition in the other communication mode.

In a further embodiment, the notification message comprises a unicast or multicast address information for the communication in the second communication mode.

In order to assist the node to send or receive in the other communication mode during the temporary switching, it is beneficial to convey, in the recently received or generated packet, address information for use in the other communication mode. For example, when the node is temporarily switched to the other communication mode, a message to be sent can be addressed to a single destination as a unicast message, or to a group of specified destinations as a multicast message. And then, as compared to a broadcast message, it is more efficient in the sense that only the addressed nodes will take further actions.

In another example, the information contained in the packet specifies an assignment to be carried out by the node when it temporarily switches to the other communication mode.

In one example, the assignment may be related to the reception of a broadcasting message with a dedicated sequence number or a packet identifier. In another example, the assignment may be related to a successful delivery of a packet to an intended destination node, such that the assignment is assumed to be accomplished only after receiving an acknowledge (ACK) message from the intended destination node.

Advantageously, the role may be assigned to the node according to at least one of: a location of the node, a predetermined system configuration, a context dependent run-time node configuration, an application deployment scheme of the wireless system.

The main communication mode is determined according to the role assigned to the node, or the main activity that the node is going to carry out. The assignment of the role may be related to a predefined system or node configuration, a system-level or network-level application deployment scheme, a physical location of the node, or a context dependent run-time configuration. For example, when there are multiple nodes deployed in a close neighborhood, it may be efficient to designate a first node mainly for lighting control, and the neighboring nodes of the first node mainly for asset tracking. Thus, the first node may mainly operate in the Zigbee mode for detection of the lighting control related packets, and then when necessary switch to the BLE mode to forward some of the lighting control information to the neighboring nodes, or to forward a trigger to a neighboring node such that it may need to collect a temporarily stored message at the first node.

In one embodiment, the role assigned to the node is a router node for facilitating communication among nodes in the wireless system.

In the wireless system, there may be different kinds of communication messages circulated among the nodes. For example, wireless communication may be used for distributing remote control commands, for remote configuration, or for collecting sensing data from remote between a central controller and the nodes. The wireless communication may also be among the nodes in the system, such as for distributed control.

In a preferred setup, the controller is further configured to determine the first communication mode to be the main communication mode, and the radio unit is further configured to operate mainly in the first communication mode to support communication among nodes in the wireless system with multi-hop routing.

It is advantageous that a node designated mainly for remote control is operating as a router node according to the first communication technology. And then the wireless system is split into a core mesh network comprising all the nodes assigned as router nodes, and many small star networks around each router node. The close neighbors of a router node may be designated to other applications, and then relying on the router node to send or receive information from remote.

In another embodiment, the role assigned to the node is an asset tracking sensor.

The node may also act as another type of sensor, which is mainly operating in one communication mode, or the main communication mode. And occasionally, the sensor node needs to switch to another communication mode for sending the collected sensing data or for receiving some information from another network.

In another preferred setup, the controller is further configured to determine the second communication mode to be the main communication mode, and the radio unit is further configured to operate mainly in the second communication mode for receiving a beacon signal from a tag device of an asset tracking system.

Advantageously, an asset tracking sensor is operating in the second communication mode with point-to-point connection or point-to-multipoint connection. And hence, as an asset tracking sensor the node is configured to receive beacon signals from one or more tag devices in the direct communication range.

In accordance with second aspect of the invention a wireless system is provided. The wireless system comprising a plurality of nodes according to the present invention.

The wireless system may be used for different applications. In one example, it is used for building automation in offices or home, or for industrial control in a factory. In another example, the control system may be used as a surveillance system for security monitoring. Or as addressed above, the wireless system may also be used for asset tracking and lighting control. It is also beneficial to use the same wireless control system to support one or more applications to improve the efficiency, considering the fact that the capacity of the network may be much higher than the actual throughput requirement of a single application.

Beneficially, the wireless system is a wireless lighting control system.

In the preferred setup, the wireless system is used for lighting control, such that for the control of switches, sensors, and lamps. The wireless system may also be used to gather status information and sensing data from actuators and sensors collocated with the lights or located close to the lights.

In accordance with a third aspect of the invention a communication method is provided. The communication method of a node in a wireless system, the method comprises the node determining a default communication mode out of multiple communication modes according to a role assigned to the node, wherein the role is related to an activity to be carried out by the node, and the multiple communication modes comprise a first communication mode capable to support a mesh or tree topology with multi-hop routing, according to a first communication technology, and a second communication mode capable to support a star topology with a point-to-point connection, according to a second communication technology;

operating either in the first communication mode as the default communication mode, and upon an instruction, switching to the second communication mode and sending a notification message in the second communication mode, and then switching back to the first communication mode; or in the second communication mode as the default communication mode, and upon another instruction, switching to the first communication mode and receiving another data or control packet in the first communication mode, and then switching back to the second communication mode;

generating the instruction to switch from the first communication mode to the second communication mode according to a security level of a data or control packet received in the first communication mode or generated by the node itself; and generating the other instruction to switch from the second communication mode to the first communication mode according to another notification message received in the second communication mode.

In one preferred setup, the first communication mode is determined to be the default communication mode, and the method further comprises the node: operating mainly in the first communication mode to support remote control or communication among nodes in the wireless system with multi-hop routing; generating an instruction according to a property of a packet that is either recently received in the first communication mode or recently generated by the node itself; and upon the instruction generated, switching temporarily to the second communication mode to send a notification message, and then switching back to the first communication mode.

In another preferred setup, the second communication mode is determined to be the default communication mode, and the method further comprises the node operating mainly in the second communication mode for receiving a beacon signal from a tag device of an asset tracking system; generating an instruction according to a notification message recently received or generated in the second communication mode; and upon the instruction generated, switching temporarily to the first communication mode for a certain duration or to carry out an assignment, and then switching back to the second communication mode.

The invention may further be embodied in a computer program comprising code means which, when the program is executed by a node comprising processing means, cause the processing means to perform the method according to the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
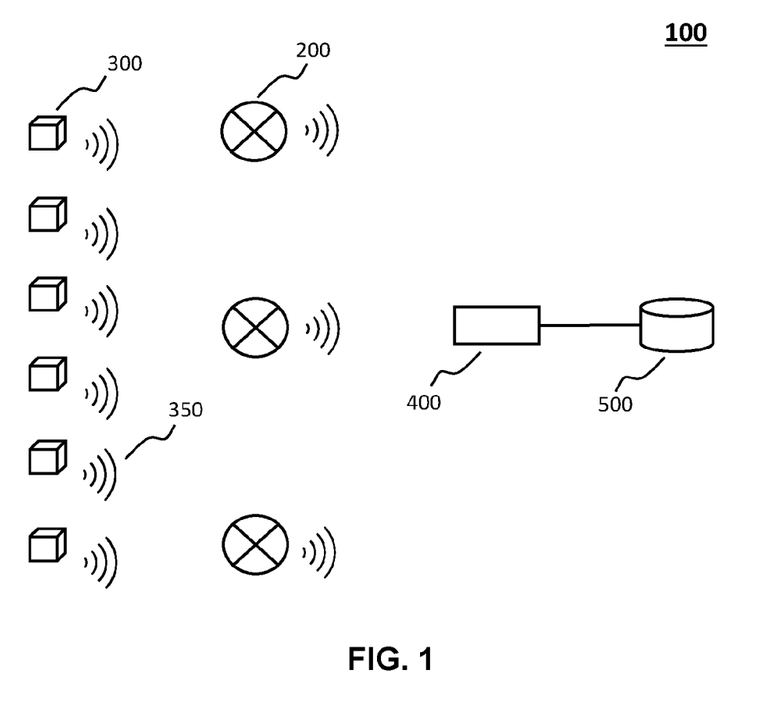
FIG. 1 schematically shows a schematic architecture of a wireless system comprising a plurality of nodes for carrying out more than one application.

Various embodiments of the present invention will now be described based on a wireless system 100 comprising a plurality of nodes 200, as shown in FIG. 1. The wireless system 100 can be a local network under the control of a local coordinator 400 to serve a certain control purpose or for data collection, and then the local coordinator may be further connected to a local application server 500. In another example, the system may be connected to the cloud, a backbone network, or a remote server 500 via a local coordinator, a gateway, a bridge, or a router device 400. In a lighting context, a node 200 may be comprised in a lighting device, a luminaire, a sensor, or a switch to serve for the communication function of the lighting device, the luminaire, the sensor, or the switch. A node 200 may also be comprised in a HVAC system, a smart refrigerator, a smart oven, other smart white goods, or another sensor or actuator, or a remote controller in a broader building/home automation context.

In addition to the wireless control application to be implemented by the nodes 200, there may be another application to be supported in the wireless system 100. In one example, the other application may be asset tracking. An asset may be a person or an object, such as a computer, a medical device, a package, etc. An asset may have or comprise a tag device 300. For example, a tag device 300 may each be attached to a respective one of the assets. Each tag device 300 may include a transmitter to transmit wireless signals 350 such as beacon signals that include identification (ID) information of the asset and/or of the tag device. For example, the tag devices 300 may transmit beacon signals, which may be compliant to a wireless standard, such as a BLE standard. Accordingly, some of the nodes 200 in the wireless system may be configured to operate also as asset sensor nodes for receiving such beacons from the tag devices 300.

Figure 2:
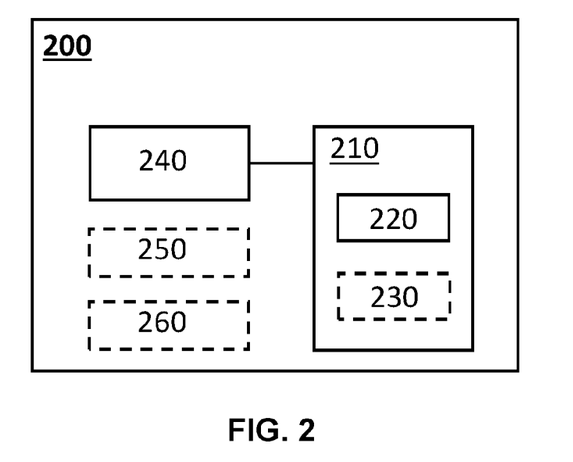
FIG. 2 schematically depicts basic components of a node in a wireless system.

FIG. 2 schematically depicts basic components of a node 200 for communication in a wireless system 100. The node 200 comprises a radio unit 210, which is capable to operate multiple communication modes comprising at least a first communication mode capable to support a mesh or tree network with multi-hop routing, and a second communication mode capable to support a point-to-point connection. The radio unit 210 may comprise a single transceiver, which is a combo device to support at least both the first and the second communication modes and operate on a time-sharing basis according to one of the multiple communication modes each time. In another example, the radio unit 210 may comprise at least two separate transceivers 220, 230. The at least two separate transceivers 220, 230 may be single mode transceivers, and each supports one communication protocol. It is also possible that out of the at least two separate transceivers 220, 230 one is a combo device and the other is a single mode device. The node 200 further comprises a controller 240, which is configured to determine a main communication mode out of multiple communication modes according to a role assigned to the node.

Optionally, the node 200 may further comprise an application controller and/or an actuator, as indicated by 250 in FIG. 2. The application controller or the actuator may be related to the control functionality of the node in a lighting context, a broader building automation context, an asset tracking context, or another application. The application controller and/or an actuator may execute the control commands received by the node. And the status information is provided by the application controller and/or the actuator as a feedback to the control system.

In another option, the node 200 may further comprise a sensor, as indicated by 260 in FIG. 2. The sensor 260 may be configured to detect presence and/or environmental information, such as temperature, humidity, etc. The sensing data may be collected in addition to or independent from the status information of the node, or the application controller and/or the actuator.

The disclosed invention may be implemented in several different scenarios, depending on the applications to be enabled by the wireless system 100, the communication interface of the node 200, such as which are the multiple communication modes supported by the node. For the ease of description, the different scenarios are explained by taking Zigbee as one example for the first communication protocol and BLE as one example for the second communication protocol.

Figure 3:
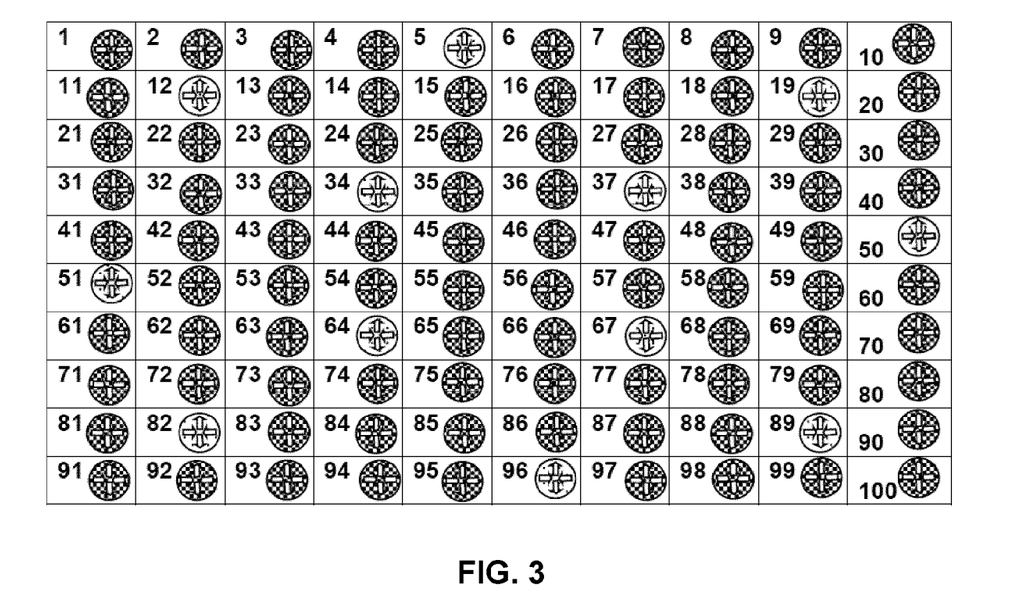
FIG. 3 demonstrates an exemplary network architecture with combo nodes according to various embodiments.

FIG. 3 demonstrates an exemplary network architecture with combo nodes according to various embodiments. The bright nodes are configured to be router nodes operating mainly in the first communication mode with the routing capability enabled. The dark nodes are configured to be asset tracking sensor nodes operating mainly in the second communication mode for receiving sensing data or for a point-to-point connection. A router node 200 is operable to distribute a control command to the plurality of nodes 200 and to forward status information from the plurality of nodes 200, via multi-hop routing. Thus, router nodes build up a sparse multi-hop network according to the first communication technology, which act as a kind of core network of the wireless system 100. Around each router node 200 with one-hop direct link, there may be quite a few non-router nodes located. For a broadcast message, the non-router node can receive it directly from at least one router node in the vicinity. Optionally, the non-router node may also be configured to operate mainly according to the second communication protocol, such as to support a second application in addition to the main application carried out by the wireless network. In that scenario, in order to deliver a message to such a non-router node, it may happen that the router node will take extra effort to switch to an operation according to the second communication protocol in an on-demand manner, or the non-router node needs to rotate between the two operation modes regularly to be able to obtain messages from the wireless network.

Thus, the first wireless communication protocol is mainly to implement large scale information distribution and collection in a wireless control system with a plurality of nodes, whereas the control system can be used for lighting control and/or building automation. It is important that the first wireless communication protocol supports multi-hop routing, which can be Zigbee, Thread, Bluetooth Mesh, Wi-Fi mesh, WirelessHART, SmartRF, CityTouch, IP500, Z-wave, or any other mesh or tree-based technology.

It is preferred that the second communication protocol is in accordance with a Bluetooth low energy, BLE, standard. It can also be Wi-Fi direct, Zigbee Inter-PAN, Zigbee Touchlink, or another wireless communication standard that favours an easy setup for point-to-point connection.

Given that the two communication systems according to the first and the second communication protocols may use different modulation schemes, different frequency plans and time scheduling, one potential benefit that the local star network around each router node operating according to the second communication protocol is that mutual interference may be reduced significantly as compared to a homogeneous network.

The availability of so-called combo radio chips, such as Zigbee/BLE and BLE/Wi-Fi chips, where there are two wireless protocol stacks sharing one radio front-end in the time domain, makes new features possible for a lighting IoT system. The new features include direct control of wireless lighting via BLE connections from a mobile, positioning of mobile phones via BLE signals sent from wireless lighting systems, and asset tracking via mobile BLE tags. While there are clear benefits of combo radio chips in lighting systems, there is also one common constraint that system designs must deal with: it is necessary to properly balance between the performance of classic lighting control and the performance of added new features. The common constraint stems from the fact that, while there are two radio protocol stacks, there is only one radio front-end that must be shared between the two radio protocol stacks—e.g. a Zigbee/BLE combo will be "blind" on BLE while active (transmitting, receiving or idle listening) on Zigbee, and vice versa. This would lead to significant performance degradation for at least one radio protocol if not managed well.

This invention proposes an operation method in lighting IoT or other wireless networks that use combo radio chips to achieve reliably more than one function. An example is a lighting IoT network where every node has one combo radio chip that needs to perform both classic lighting control or data collection function (via Zigbee or Wi-Fi) and asset tracking function (using BLE). The system may also be constructed by nodes each comprising multiple single radio chips. And then it is not critical to schedule the multiple communication modes on a time-sharing basis. However, considering the same frequency bands are shared by the different short-range wireless communication technologies and energy efficiency, it may still be quite beneficial to avoid the scenario that more than one communication mode is enabled at the same time by the node.

In one example, tag devices 300 send BLE beacons periodically which are being received by the nodes 200 using their combo radio chips in a lighting network 100. Measurement data of the BLE beacons are gathered and results are being sent through the lighting network 100 using the Zigbee protocol. To make both lighting control and asset tracking feasible and reliable, it is disclosed to designate a fixed set of nodes as routers that operate only or mainly in Zigbee mode, while the rest of the nodes operate in both the Zigbee and BLE modes. The set of routers will maintain Zigbee operations to provide the connectivity of the entire wireless system. The non-router nodes will be configured mainly in the BLE mode but will be in the Zigbee mode when it has something to send or to receive in Zigbee mode, e.g. to/from/via the router nodes. The reason why non-router nodes operate mainly in the BLE mode is to facilitate the reception of BLE beacon signals from tag devices. The longer non-router nodes can operate in the BLE mode, the better performance is for the reception of BLE signals from a tag device and hence the better is (indirectly) for the battery lifetime of the tag device, because the beacon transmission rate may be reduced without degrading the tracking performance.

An illustration of such a network configuration is shown in FIG. 3, where the bright nodes are router nodes for lighting control application, and the dark nodes are non-router nodes and mainly used for asset tracking. If there are enough Zigbee router nodes nearby non-router nodes have no problem to send information via the lighting control network. However, non-router nodes may have problems to receive Zigbee messages if they operate mainly in the BLE mode and therefore it is likely to miss the majority of Zigbee packets. One option is to use the "end-device" role in Zigbee where bright nodes are the parents of end devices or the dark nodes. Then a parent will store messages for a child node, and the child node needs to poll periodically whether the parent has any message for it. The polling has a disadvantage that messages sent to the non-router node arrive with a latency. The latency is on average about half the polling period, with a maximum of one polling period. To reduce the latency by implementing a (more) frequent polling by the end device is not desirable, because that will compromise asset tracking performance consequently. Therefore, the inventors recognize it is advantageous to reduce the latency by sending a notification from the parent to the end-device that there is something for them to pick up via the other communication mode, which is the Zigbee mode in this example.

In another example, the "end-device" mechanism according to the Zigbee standard is not used, a router node that needs to send a message to a non-router node would first switch to BLE and send a notification message to the non-router node. The notification message may be a short message that contains no or only partial application content. The router node then switches back to the Zigbee mode and only then (i.e. after the time that takes the non-router to also switch to Zigbee) sends the message over Zigbee to the non-router node. The non-router, upon the reception of the notification message in the BLE mode, switches to Zigbee mode to receive the actual application message and then goes directly back to the BLE mode, such that the main assignment on asset tracking is not affected too much for the non-router node. The actual application message is typically longer and contains full application content in the case that the notification message contains no application content; or it contains partial application content that together with the partial application content conveyed in the notification message represents the full application content.

Furthermore, the Zigbee communications may be completely secured since every node is part of the same Zigbee network after they join the network and the standard Zigbee security will be applied, or even additional application-level security. On the other hand, although the easy setup of the point-to-point connection in the BLE mode is very attractive, the advertisements are not typically secured by the BLE standard specifications. Some of the application data from the Zigbee network with more strict security requirements may not be suitable to send directly via BLE advertisement messages. The transmission of notifications instead of the actual application data, there is much less security concern for protection of the notifications, or it is much more straightforward or simpler to implement proper security mechanisms. Furthermore, an application layer security mechanism may be applied to BLE advertisement data payload if security is needed. And distribution of security keys for BLE advertisements can be done via the (already secured) Zigbee networks.

Taking the example in the previous section, bright nodes are Zigbee router nodes that operate only or mostly in the Zigbee mode while dark nodes are Zigbee non-router nodes that operate mainly in the BLE mode for asset tracking. Zigbee router nodes need to be in the Zigbee mode most of the time for constantly listening on Zigbee networks to maintain proper operations. Similarly, non-router nodes need to stay mostly in the BLE mode to listen to BLE signals from tag devices. Therefore, the best way to send any packets from the control network, or the Zigbee network, to the non-router nodes is in the mode in which they operate the most, the BLE mode.

In one scenario, a bright node (router node) needs to send a broadcast message to all the nodes or many of the nodes in the network. This is typically a lighting control message triggered by a sensor or a switch that is co-located with the bright node but can also come from other sources such as a scheduler, a central controller, or another controller in the network. All the intended nodes in the network need to receive it within a short time so that all the intended lights behave in a synchronized manner in front of the user. The broadcast message is sent first in the Zigbee mode such that all bright nodes will be able to receive according to the Zigbee broadcast protocol. In addition, the bright nodes will also send notifications in the form of short BLE beacons or advertisements to reach dark nodes (non-router nodes) reliably since dark nodes are in the BLE mode most of the time. The notifications are simply to inform the intended dark nodes in the surrounding to switch to and listen on the Zigbee mode. The Zigbee broadcasting may be repeated several times, such as 3-4 times, by the bright Zigbee router nodes with a certain interval, such as 0.5 second. Each time the re-broadcasting by the neighbouring router nodes lasts about 100 ms. Therefore, if the dark nodes switch quickly to Zigbee receiving mode for the duration until Zigbee broadcast stops, which lasts around 1-1.5 seconds, it is highly likely they will receive the application data from the on-going Zigbee broadcasts, such as without the need for polling the parent as described in an earlier example. Therefore, the benefits of the disclosed method includes reduced latency (much less than polling cycle and almost synchronous with the reception by the router nodes) and reduced workload (no fixed polling cycle scheduled).

As a refinement to this, the dark nodes may also switch back and forth quickly between BLE mode and Zigbee mode in the aforementioned duration, such that the dark nodes may also spend some time in BLE mode without impairing the chance it receives Zigbee broadcasts. As another refinement the notifications uniquely identifies the Zigbee broadcast message, so that a dark node can switch back to BLE once it has successfully received one instance of the Zigbee broadcast message and does not have to wait for repeats of the same message. This greatly improves the listening time on BLE. Otherwise the whole asset tracking network might be "deaf" or "blind" during the Zigbee broadcast cycle for around 1-1.5 second. To uniquely identify a Zigbee broadcast message in the notifications, a combination of a source address and a sequence number could be used. To uniquely identify a Zigbee unicast message in the notification, a combination of a source address, a destination address, and a sequence number could also be used.

The system may be further improved by aligning the sending of notifications and Zigbee (re-)broadcasting in a bright node. Ideally, notifications to the dark nodes are sent just before Zigbee (re-)broadcasting so that nearby dark nodes would have already been informed and have prepared in advance by switching to the Zigbee mode for receiving the incoming Zigbee (re-)broadcasts. This would require a timely coordination of the two modes with a node. A further refinement is that an expected time latency for starting Zigbee (re-)broadcasts after sending a notification message is also included in the notification such that a dark node can prepare better its schedule to receive Zigbee broadcasts according to the estimated latency.

In another refinement the dark node can use the time characteristics of Zigbee broadcasts. Zigbee rebroadcasts last about 100 ms and are spaced by 0.5 second, a dark node may choose to only listen to Zigbee after the expected latency for 100 ms and switch back to its main communication mode (BLE) until 0.5 second later to switch to Zigbee again for 100 ms. In this way, dark nodes may spend very limited time on Zigbee without missing Zigbee broadcasts. Since such timing-related parameters may depend on the node firmware and/or size of the network, a node might be configured (by commissioner, central controller and/or router node) to use certain timing values, or to learn optimal values by observing the pattern. This scheme can be used in combination with other embodiments/examples, such as the combination with the scheme of stop listening on Zigbee once the dark node has received an intended Zigbee broadcast message successfully.

In another example, non-routing dark nodes are Zigbee end devices, which are listening on the BLE channel as a default mode. The notification messages are sent by the router nodes as BLE advertisements to the non-routing dark nodes. Upon reception, the non-routing dark nodes will switch to the Zigbee mode, and check (as end-device) with their parent nodes according to the Zigbee protocol for receiving Zigbee (broadcast) data that is buffered by their parents. In this way, the initiative is completely on the dark nodes to receive some data.

Although the scenarios addressed so far are about sending broadcast messages from the control network to the nodes serving asset tracking application, similar mechanism can be applied for unicast messages. For unicast, the switching to Zigbee can be optimized by supplying the Zigbee address of the intended receiver in the BLE notification message. Thus, only the intended receiver switches to Zigbee whereas the others can stay on BLE to listen for beacon signals from tag devices.

Figure 4:
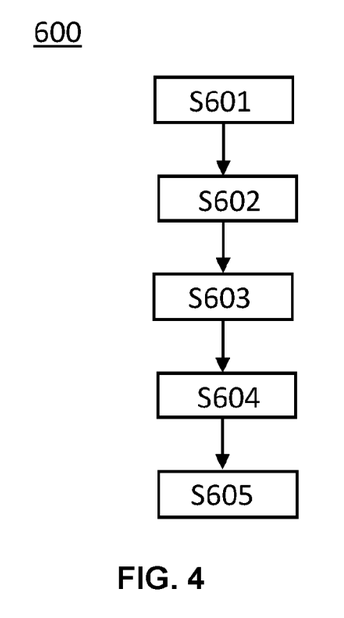
FIG. 4 shows a flow diagram of a communication method of a node in a wireless system.

FIG. 4 shows a flow diagram of a communication method 600 of a node 200 in a wireless system. In step S601, a main communication mode is determined out of multiple communication modes according to a role assigned to the node, and the multiple communication modes comprise a first communication mode capable to support a mesh or tree topology with multi-hop routing, according to a first communication technology, and a second communication mode capable to support a star topology with a point-to-point connection, according to a second communication technology. The method further comprises step S602 that the node operates mainly in the main communication mode; and in step S603, an instruction is generated according to a property of a packet that is either recently received in the main communication mode or recently generated by the node itself; and upon the instruction generated, the node switches, in step S604, temporarily to the other communication mode out of the multiple communication modes for sending or receiving using the other communication mode. And then in step S605, the node switches back to the main communication mode.

The method according to the present invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer or a processing means comprised in a node or a network or a commissioning device as disclosed in the above-described embodiments.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor and may also be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A node for communication in a wireless system, the node comprising:
   a controller configured to determine a default communication mode out of multiple communication modes according to a role assigned to the node, wherein the role is related to an activity to be carried out by the node and the multiple communication modes comprises:
   a first communication mode capable to support a mesh or tree topology with multi-hop routing, according to a first communication technology, and
   a second communication mode capable to support a star topology with a point-to-point connection, according to a second communication technology;
   a radio unit (210) configured to:
   operate in the first communication mode as the default communication mode, and upon an instruction from the controller, switch to the second communication mode and send a notification message in the second communication mode, and then switch back to the first communication mode;
   wherein the controller is further configured to:
   generate the instruction to switch from the first communication mode to the second communication mode according to a security level of a data or control packet received by the radio unit in the first communication mode or generated by the node itself.

2. The node of claim 1, wherein the notification message indicates scheduling information related to switching to the first communication mode for another node currently operating in the second communication mode, which can be at least one of:
   a delay, after which, subsequent to the reception of the notification message, a radio unit of the other node shall switch to the first communication mode, and
   a time duration that the other node shall stay in the first communication mode.

3. The node of claim 1, wherein the notification message comprises a unicast or multicast address information regarding one or more intended destination nodes of the notification message.

4. The node of claim 1, wherein the role may be assigned to the node according to at least one of: a location of the node, a predetermined system configuration, a context dependent run-time node configuration, or an application deployment scheme of the wireless system.

5. The node of claim 1, wherein the role assigned to the node is a router node for facilitating communication among nodes in the wireless system.

6. The node of claim 5, wherein the controller is further configured to determine the first communication mode to be the default communication mode, and the radio unit is further configured to operate mainly in the first communication mode to support among nodes in the wireless system with multi-hop routing.

7. A wireless system comprising a plurality of nodes as claimed in claim 1.

8. The wireless system of claim 7, the wireless system is a wireless lighting control system.

9. A communication method of a node in a wireless system, the method comprising the node:
   determining a default communication mode out of multiple communication modes according to a role assigned to the node, wherein the role is related to an activity to be carried out by the node, and the multiple communication modes comprises:
   a first communication mode capable to support a mesh or tree topology with multi-hop routing, according to a first communication technology, and
   a second communication mode capable to support a star topology with a point-to-point connection, according to a second communication technology;
   operating
   in the first communication mode as the default communication mode, and upon an instruction, switching to the second communication mode and sending a notification message in the second communication mode, and then switching back to the first communication mode; and
   generating the instruction to switch from the first communication mode to the second communication mode according to a security level of a data or control packet received in the first communication mode.

10. A non-transitory computer readable medium comprising instructions which, when the instructions are executed by a processor of a node, cause the processor to perform the method of claim 9.

* * * * *